United States Patent

[11] 3,597,014

| [72] | Inventor | Stanley L. Stokes<br>Florissant, Mo. |
|---|---|---|
| [21] | Appl. No. | 861,358 |
| [22] | Filed | Sept. 26, 1969 |
| [45] | Patented | Aug. 3, 1971 |
| [73] | Assignee | Wagner Electric Corporation<br>Newark, N.J. |

[54] CONTROL VALVE
24 Claims, 4 Drawing Figs.

[52] U.S. Cl. ................................................ 303/6 C,
60/54.5 E, 188/349, 200/82 D, 303/84 A
[51] Int. Cl. ...................................................... B60t 11/34,
B60t 17/22
[50] Field of Search.......................................... 303/6, 6 C,
22, 22 A, 84, 84 A; 188/151, 151.11, 152, 152.11;
60/54.5; 200/82, 82.3

[56] References Cited
UNITED STATES PATENTS

| 3,441,318 | 4/1969 | Bueler | 303/6 |
| 3,450,443 | 6/1969 | Bueler | 303/6 |
| 3,464,741 | 9/1969 | Falk | 303/6 |
| 3,472,559 | 10/1969 | Bueler | 303/6 |
| 3,480,333 | 11/1969 | Stelzer | 303/6 |
| 3,498,681 | 3/1970 | Bueler | 303/6 |

Primary Examiner—Milton Buchler
Assistant Examiner—John J. McLaughlin
Attorney—Joseph E. Papin ABSTRACT: A control valve for use in a split braking system with a split master cylinder including a housing having a divider portion therein provided with a flow passage for one of the supplied fluid pressures and a bypass passage connected in bypass relation therewith. A proportioning valve is movable in the divider portion controlling said flow passage to normally establish an applied fluid pressure in a predetermined ratio with the one supplied fluid pressure. A warning or switch operating piston compares the magnitudes of the supplied fluid pressures and in its normal or centered position closes the bypass passage, said switch piston being movable upon the failure of the other of the supplied fluid pressures toward a translated position opening the bypass passage to effect open pressure fluid communication between the one supplied and applied fluid pressures therethrough in bypass relation with the flow passage to obviate the proportioning function of the proportioning valve.

PATENTED AUG 3 1971 3,597,014

INVENTOR
STANLEY L. STOKES
BY
Joseph E. Papin.

3,597,014

CONTROL VALVE

This invention relates in general to dual or split braking systems and in particular to driver-warning valves utilized therein.

In the past dual or split braking systems, a combination type control valve was connected between a dual or split master cylinder and the vehicle front and rear brakes. The combination valve was provided with a proportioning portion connected between one fluid pressure generating chamber of the split master cylinder and the rear brakes having a proportioning or metering piston responsive to one fluid pressure supplied thereto from the one split master cylinder chamber to establish an applied fluid pressure having proportionally reduced magnitude at the rear brakes, and said combination valve was also provided with a warning portion connected across both fluid pressure generating chambers of the split master cylinder having a shiftable or translatory switch-operating piston for comparing the magnitudes of the respective fluid pressures supplied from the split master cylinder chambers. Of course, in the event of the failure of the other fluid pressure supplied from the other of the split master cylinder chambers to the vehicle front brakes, it was necessary to, in effect, apply the one supplied fluid pressure directly to the rear brakes in bypass relation with the proportioning piston to obviate the proportioning effect thereof on the one supplied fluid pressure in order to utilize the maximum available fluid pressure for braking under this emergency condition. The translatory movement of the switch piston upon the failure of the other fluid pressure was utilized not only to effect the aforementioned bypassing function but also to actuate a switch mechanism to energize a driver warning or dash lamp indicating a failure in the braking system.

One of the past combination control valves utilized in the past split braking systems was referred to as an "in line" construction wherein the proportioning and warning pistons were in axial alignment, and a portion of the warning piston was used as a seat for proportioning or metering engagement with the proportioning piston. Of course, one of the undesirable or disadvantageous features of the "in line" control valve was that the seating or metering engagement of the proportioning piston with the warning piston manifestly transferred an additional or unbalanced force to the warning piston, and since said warning piston was comparing the magnitudes of the supplied fluid pressures, i.e., substantially balanced by the supplied fluid pressures in a centered position, it was necessary to contend with and/or compensate for such additional force so transferred to the warning piston.

Another of the past combination control valves utilized in the past split braking systems was referred to as a "split bore" construction wherein the proportioning and warning pistons were provided in spaced or side-by-side bores which were interconnected by suitable cross passages or drillings. Of course, one of the undesirable or disadvantageous features of the "split bore" control valves was that such spaced bores and interconnecting drilled passages were manifestly more difficult to machine and involved a greater cost of manufacture, and another disadvantageous or undesirable feature was that the "split bore" control valve was manifestly larger contrary to the emphasis currently being placed on compactness of design due to the limitations of "under-the-hood" space available in modern vehicles.

The primary object of the present invention is to provide a combination control valve which overcomes the aforementioned undesirable or disadvantageous features, as well as others; and this, as well as others objects and advantageous features of the present invention, will become apparent hereinafter.

Briefly, the invention comprises a housing having divider means providing a pair of separate flow passages therethrough for one of the separate fluid pressures supplied to said housing, metering means controlling one of said flow passages and movable in response in the one supplied fluid pressure toward a metering position in said one flow passage to establish a metered applied fluid pressure therethrough, and other means for controlling the other of said flow passages and for comparing the magnitudes of the supplied fluid pressures, said other means being movable in response to the one supplied fluid pressure acting thereon toward a position in said other flow passage establishing open pressure fluid communication between the one supplied fluid pressure and the applied fluid pressure through said other flow passage in bypass relation to said one flow passage to obviate the metering actuation of said metering means in the event of the failure of the other of the supplied fluid pressures acting on said other means.

In the drawings, wherein like numerals refer to like parts wherever they occur:

Figure 2:
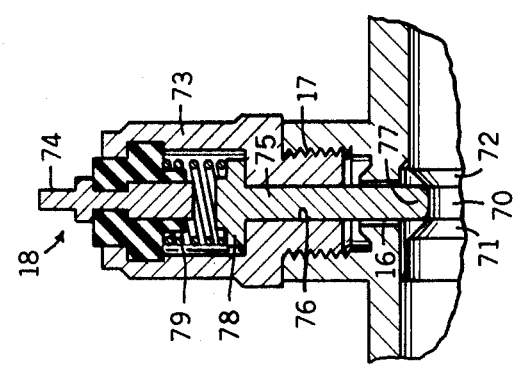
FIG. 2 is a partial sectional view taken along line 2-2 of FIG. 1.
Figure 1:
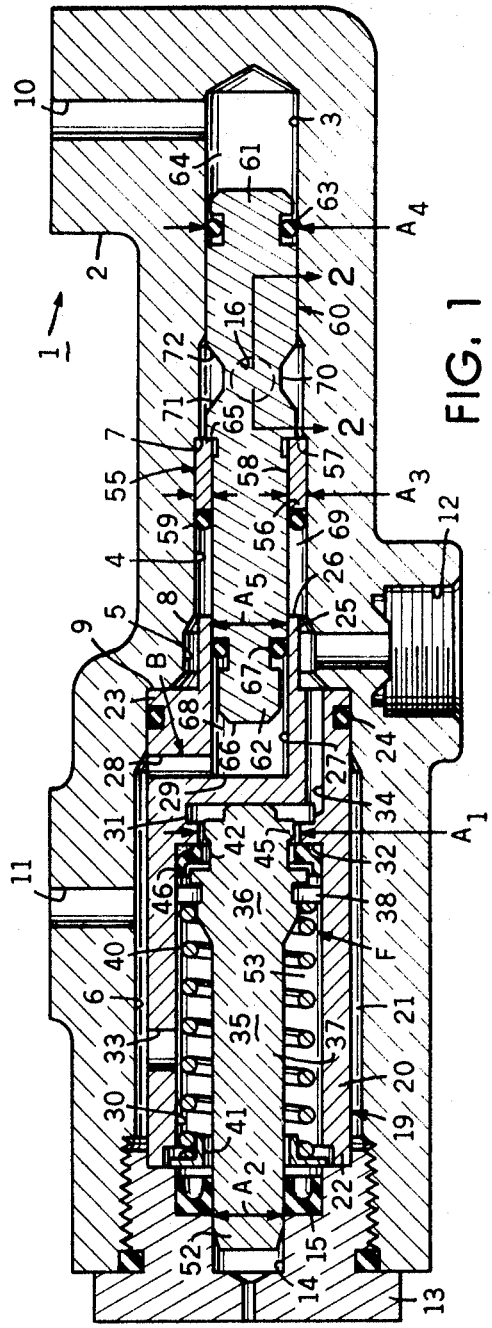
FIG. 1 is a sectional view illustrating a control valve embodying the present invention in cross section.

Referring now to the drawings in detail and in particular to FIG. 1, a control valve 1 is provided with a housing 2 which is adapted for direct connection with the housing of a dual or split system master cylinder (not shown); however, if desired, said control valve can be remotely positioned with respect to said master cylinder, as is well known in the art. The housing 2 is provided with a bore 3 in axial alignment with stepped counterbores 4, 5 and 6, and shoulders 7, 8 and 9 are provided on said housing between the bore and counterbore 3 and 4, the counterbores 4 and 5, and the counterbores 5 and 6, respectively. Inlet ports 10, 11, which are adapted for connection with the separate fluid pressure generating chambers of the split system master cylinder, are provided in the housing 2 intersecting with the bore 3 adjacent to its rightward end and with the counterbore 6 adjacent to its midportion, respectively, and an outlet port 12, which is adapted for connection with one of the rear end front vehicle brakes (not shown), is also provided in said housing intersecting with the counterbore 5. A closure member or end plug 13 is threadedly received in the leftward or open end of the counterbore 6 having a centrally located guide bore 14 therein, and a seal 15 is also positioned in said closure member about said guide bore. Referring now also to FIG. 2, a crossbore 16 is also provided in the housing 2 having one end intersecting with the bore 3 adjacent to the shoulder 7 and the other end thereof connecting with a cross counterbore 17 which is threaded at its open end to receive an electrical switch 18, to be discussed hereinafter.

Figure 3:
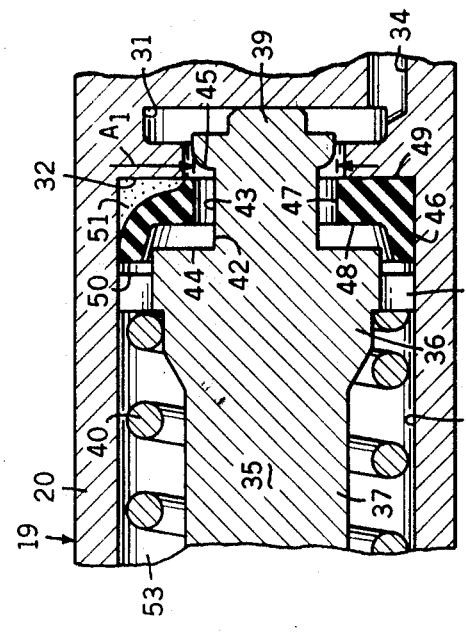
FIG. 3 is an enlarged fragmentary view taken from Fig. 1.

Referring now to FIGS. 1 and 3, a sleeve or divider member, indicated generally at 19, is provided with a sleeve or body portion 20 which extends coaxially through the housing counterbore 6, and the peripheral or annular chamber 21 is defined between said housing counterbore and divider body connected in open pressure fluid communication with the inlet port 11 at all times. The divider body 20 is provided with opposed end portions 22, 23 in abutting engagement between the interior end of the closure member 13 and the housing shoulder 9, and a peripheral seal 24 is carried in said divider body adjacent to the opposed end portion 23 in sealing engagement with the housing counterbore 6. An extension 25 is integrally provided on the end portion 23 of the body 20 extending coaxially through the housing counterbore 5 and having a free end or abutment 26 thereon terminating substantially at the housing shoulder 8. A blind bore 27 is axially provided through the free end 26 of the extension 25 extending into the body 20, and a cross passage 28 is provided in said body having one end connected in open pressure fluid communication with the annular chamber 21 and the other end thereof intersecting with said blind bore adjacent to the end wall 29 thereof. Another bore 30 is provided in body 20 having one end thereof intersecting with the body end portion 22 and the other end thereof connecting with a stepped recess or bore 31 also provided in said body, and another shoulder 32 is provided on said body at the intersection of said bore and stepped recess. A cross passage 33 is provided in the body 20 connecting the body bore 30 in open pressure fluid communication with the annular chamber 21 at all times, and another passage 34 has one end connected with the stepped recess 31 and the other end thereof intersecting with the body rightward or opposed end portion 23 being in open pressure fluid communication with the outlet port 25 through the housing counterbore 5 at all times. It should be noted that the cross passage 33, bore 30, stepped recess 31 and passage 34 of the body 20 defines a flow passage, indicated generally at F, which is connected with the inlet port 11 through the annular chamber 21 and with the outlet port 12 through the housing counterbore 5, and it should also be noted that the passage 28 and bore 27 of the body 20 defines a bypass passage, indicated generally at B, which is connected in parallel, shunting or bypass relation with the flow passage F being connected with said inlet port 11 through said annular chamber 21 and with said outlet port 12 through the housing counterbores 4, 5.

A metering or proportioning member or piston, indicated generally at 35, is provided with a head portion 36 integrally formed with a reduced extension or stem portion 37. The head 36 is provided with a plurality of radially extending guides 38 slidably engaged with the divider body bore 30 and a rightward portion or free end 39, and a proportioning or metering spring 40 is precompressed between said head portion and a retainer 41 to respectively urge said free end and retainer into abutment with the end wall of the divider body stepped bore 31 and the interior end of the closure member 13, respectively. An annular peripheral groove 42 is provided in the proportioning pistonhead 36 having base wall 43 interposed between opposed radially extending sidewalls 44, 45, said sidewall 45 defining a valve member for engagement with an annular sealing or seating member 46. The sealing member 46 is provided with an annular base portion 47 radially spaced from the groove base wall 43 and interposed between opposed sides 48, 49. The seal side 49 is normally seated in abutment with the divider body shoulder 32 and also defines a valve seat for engagement with the valve member or groove sidewall 45. The seal 46 is also provided with an annular peripheral lip 50 in sealing engagement with the divider body bore 30, and a plurality of radially extending return flow passages or ribs 51 are provided between the seal side 49 and lip 50, said return flow passages being normally closed by the sealing engagement of said seal lip with said divider body bore. The proportioning piston extension 37 extends coaxially through the divider body bore 30 and the closure member seal 15 in sealing engagement therewith, and said proportioning piston extension is provided with a leftward or free end portion 52 which is slidably received in the closure member bore 14. An inlet chamber 53 is defined in the divider body bore 30 between the closure member 13 and the sealing member 46 and is connected in open pressure fluid communication with the inlet port through the housing chamber and cross passage 33 at all times. It should be noticed that the sealing engagement of the groove sidewall or valve member 45 with the valve seat 49, as discussed hereinafter, defines an effective area $A_1$ on the proportioning piston which is subjected to the fluid pressure at the outlet port 12 at all times, and another effective area $A_2$ is provided by the sealing engagement of the free end 52 of the proportioning piston 35 with the closure member seal 15 and subjected to the atmosphere in the closure member bore 14 at all times, said area $A_1$ being opposed to and predeterminately greater than the area $A_2$.

A centering member or piston, indicated generally at 55 in FIG. 1, is slidably received in the housing counterbore 4 having opposed ends or abutment surfaces 56, 57 and an axially extending bore 58 is provided through said centering piston between said opposed ends thereof. A sealing member 59, such as the O-ring seal, is sealably engaged between the housing counterbore 4 and the leftward end 56 of the centering piston 55, and the rightward opposed end 57 thereof is normally engaged with the housing shoulder 7, said O-ring seal and leftward end of said centering piston defining an annular effective area $A_3$ subjected to the fluid pressure at the outlet port 12 at all times.

A reciprocal switch-actuating member or piston, indicated generally at 60, is shown in it its centered or normal operating position in the housing 2 having opposed extensions, flanges or end portions 61, 62 thereon. The switch piston end portion 61 is slidably received in the housing bore 3, and a peripheral seal 63 is carried on said switch piston end portion in sealing engagement with said housing bore. The sealing engagement of the seal 63 with the housing bore 3 defines an effective cross-sectional area $A_4$ on the end portion 61 which is subjected to the fluid pressure at the inlet port 10 at all times, and an inlet chamber 64 is defined in said housing bore between the rightward end wall thereof and said end portion in open pressure fluid communication with said inlet port at all times. The switch piston 60 is slidably received in the centering piston bore 58 and extends through the O-ring seal 59 in sealing engagement therewith, and an annular shoulder or abutment 65 is provided on said switch piston for driving or centering engagement with the rightward end 57 of the centering piston 55. The switch piston end portion 62 is slidably received in the bore 27 of the divider body extension 25 having a free end 66 thereon in said extension bore, and an O-ring seal 67 is carried in said switch piston end portion adjacent to said free end thereof normally in sealing engagement with said extension bore. The sealing engagement of the O-ring seal 67 with the extension bore 27 defines another effective cross-sectional area $A_5$ on the switch piston end portion 62 which is subjected to the fluid pressure at the inlet port 11 at all times. Another inlet chamber 68 is defined in the extension bore 27 between the end wall 29 thereof and the switch piston end portion 62 in open pressure fluid communication with the inlet port 11 at all times through the connecting passage 28 and the housing annular chamber 21, and the sealing engagement of the O-ring seal 67 with the extension bore interrupts pressure fluid communication between the inlet chamber 67 and an outlet chamber 69. The outlet chamber 69 is defined in the housing counterbores 4, 5 between the divider body end portion 23 and the centering piston seal 59 and also includes the divider body stepped bore 31 and passage 34. The inlet and outlet chambers 53, 69 are normally connected in open pressure fluid communication with each other through the proportioning piston groove 42, and the sealing engagement of the switch piston seal 67 with the divider body bore 27 normally interrupts pressure fluid communication between the inlet and outlet chambers 68, 69. It should be noted that the area $A_5$ is opposed to and less than the area $A_4$, and the area $A_3$ is additive to and greater than the area $A_5$; however, the sum of the areas $A_3$, $A_5$ is greater than the area $A_4$.

Referring now to FIGS. 1 and 2, the switch piston 60 is also provided with a switch-positioning portion or 1 and 70 between the opposed end piston 61, 62 thereof which is aligned with the housing cross bore 16 when said switch piston is in its centered position, as shown, and peripheral cam faces or surfaces 71, 72 are also provided on said switch piston on opposite sides of said land. The switch 18, as previously mentioned, is provided with a conductive closure or plug member 73 threadedly received in the open end of the housing cross bore 17, and a metal terminal 74 extends through said plug member being insulated therefrom, said terminal having an exterior end for connection in an electrical circuit of a type well known to the art for selectively energizing a driver-warning or dash lamp (not shown). A conductive switch member 75 is slidably received in a bore 76 provided in the switch plug 73 and in electrical contact or conductive engagement therewith, and said switch member is provided with a follower portion or end 77 extending through the housing cross bore 16 into following engagement with the land 70 and cams 71, 72 of the switch piston 60. The switch member 75 is also provided with an upper end 78 defining a contact for electrical contact or conductive engagement with the interior end of the terminal 74, and a switch spring 79 urges the contact 78 from said terminal interior end and the follower end 77 toward engagement with the switch piston 60.

In the operation with the component parts of the control valve 1 positioned as shown in the drawings and as described hereinabove, separately supplied or input fluid pressures $P_1$, $P_2$ normally having substantially equal magnitudes are transmitted upon actuation of the split system master cylinder (not shown) to the inlet ports 10, 11, respectively, of the control valve 1. The input fluid pressure $P_1$ flows from the inlet port 10 into the inlet chamber 64 acting on the switch piston area $A_4$ to establish a force $P_1 A_4$, and the input fluid pressure $P_2$ flows from the inlet port 11 through the housing annular chamber 21 and the divider body passage 28 into the bore 27 acting on the switch piston area $A_5$ to establish a force $P_2 A_5$ in opposition to the force $P_1 A_4$. The fluid pressure $P_2$ also flows from the inlet port 11 through the housing annular chamber 21, the divider body passage and bore 33, 30, the annular groove 42 of the proportioning piston 35 into the divider body stepped bore 31 and therefrom through the passage 34 and the housing counterbores 4, 5 to establish an applied or output fluid pressure Po at the outlet port 12. The applied or output fluid pressure $P_o$ so established in the outlet chamber 69 acts on the effective area $A_3$ of the centering piston 55 to establish a force $P_o A_3$ normally urging the centering piston 55 and seal 59 rightwardly in the housing counterbore 4 to engage the rightward end 57 of said centering piston in abutment with the housing shoulder 7 and the switch piston shoulder 65, said force $P_o A_3$ being additive to the force $P_2 A_5$. Since the sum of the areas $A_3$, $A_5$ is greater than the area $A_4$, as mentioned hereinbefore, it is apparent that the additive forces $P_2 A_5$, $P_o A_3$ are greater than the opposing force $P_1 A_4$ to normally obviate leftward translatory movement of the switch piston 60 from its centered position. Further, since the force $P_o A_3$ urges the centering piston 55 into engagement with the housing shoulder 7, it is also apparent that the force $P_1 A_4$ is greater than the force $P_2 A_5$ to normally oppose rightward translatory movement of the switch piston 60 from its centered position, since the area $A_4$ is greater than the area $A_5$.

The input fluid pressure $P_2$ acts on the input effective area $A_1 - A_2$ of the proportioning piston 35 to establish an input force $P_2(A_1 - A_2)$ and the output fluid pressure $P_o$ acts on the output effective area $A_1$ of said proportioning piston to establish an output force $P_o A_1$ opposed to the input force $P_2 (A_1 - A)$. Since the input and output fluid pressures $P_2$, $P_o$ are initially equal through the range OR, as shown on the line ORS in the graph of FIG. 4, and since the output area $A_1$ is greater than the input area $A_1 - A_2$ of the proportioning piston 35, it is obvious that the output force $P_o A_1$ is greater than the input force $P_2 (A_1 - A_2)$; however, the compressive force Fc of the metering spring 40 is additive to the input force $P_2(A_1 - A_2)$ and thereby movement of the proportioning piston 35 is prevented until the input and output fluid pressures $P_2$, $P_o$ exceed the predetermined value R, as shown by the line OR in the graph of FIG. 4. When the predetermined value R of the input and the output fluid pressures $P_2$, $P_o$ is attained, the output force $P_o A_1$ overcomes the additive input and spring forces $P_2 (A_1 - A_2)$, $F_c$ to move the proportioning piston 35 from its normal position in a leftward direction toward an operative or metering position against the compressive force $F_c$ of the metering spring 40. This leftward movement of the proportioning piston 35 initially moves the valve member 45 thereof into lapped engagement with the rightward face or seat 49 of the sealing or valve element 46 to interrupt pressure fluid communication between the inlet and outlet ports 11, 12 through the flow passage F and isolate the input fluid pressure $P_2$ from the output fluid pressure $P_o$.

Figure 4:
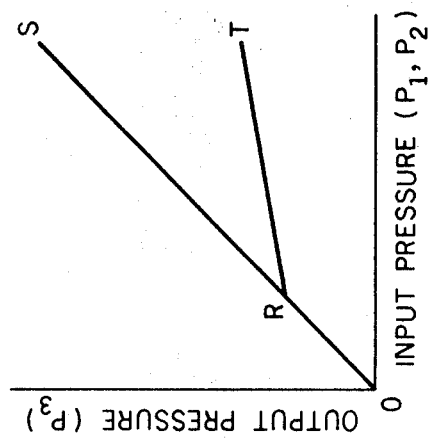
FIG. 4 is a graphical representation of the applied or output fluid pressure effected by the proportioning valve of FIG. 1 in response to the input or supplied fluid pressure.

It is obvious that the increases in the magnitude of the input fluid pressure $P_2$ in excess of the predetermined value R, as illustrated by the line RS in the graph of FIG. 4, will result in proportionally reduced or metered increases in the output fluid pressure $P_o$, as illustrated by the line RT. For instance, when the input fluid pressure $P_1$ is further increased to a value in excess of the predetermined value R, the input force $P P_2 (A_1 - A)$ is correspondingly increased and additive to the spring force $F_c$ to overcome the output force $P_o A_1$; therefore, the proportioning piston 35 is moved rightwardly toward a metering position disengaging the proportioning piston valve member 45 from the sealing member seat 49 to effect a metered application of the increased input fluid pressure $P_2$ through the proportioning piston groove 45 into the outlet chamber 69 and therefrom to the outlet port 12 to effect a proportional or ratioed increase in the output fluid pressure $P_o$, as shown by the line RT in the graph of FIG. 4, wherein $$P_o = (P_2(A_1 - A) + F_c / A_1.$$

Of course, the increased output fluid pressure $P_o$ in excess of the predetermined value R effects a corresponding increase in the output force $P_o A_1$, and when the increased output force $P_o A_1$ attains an increased value substantially equal to the additive increased input force and spring force $P_2 (A_1 - A_2)$, $F_c$, the proportioning piston 35 is again moved leftwardly to reposition the valve member 45 thereof in lapped engagement with the sealing member seat 49 closing the proportioning piston groove 42 to again isolate the input and output fluid pressures $P_2$, $P_o$. It is, of course, obvious that the proportioning piston will be responsive to further increases the input fluid pressure $P_2$ to effect further proportional increases the output fluid pressure $P_o$ in the same manner as previously described. It should also be noted that as the input and output fluid pressures $P_2$, $P_o$ are so increased, the separate input fluid pressure $P_1$ is also increased to substantially the same magnitude as the input fluid pressure $P_2$.

When the split system master cylinder is deactuated, the input fluid pressures $P_1$, $P_2$ are vented to atmosphere which eliminates the forces $P_2 A_5$ and $P_1 A_4$ acting on the switch piston 60, as well as the input force $P_2 (A_1 - A_2)$ acting on the proportioning piston 35. Upon elimination of the input fluid pressure $P_2$, the output fluid pressure $P_o$ acting on the sealing member 46 displaces the lip 50 thereof from sealing engagement with the divider body bore 30, and in this manner, the applied or output fluid pressure $P_o$ returns from the outlet port 12 through the outlet chamber 69, the return flow passages 51 in said sealing member and between said displaced lip thereof and said divider body bore into the inlet chamber 53 and therefrom through the divider body passage 33 and the housing annular chamber 21 to the inlet port 11. When the output fluid pressure $P_o$ is so reduced to correspondingly reduce the output force $P_o A_1$ to a value less than that of the metering spring force $F_c$, the metering spring 40 moves the proportioning piston 35 rightwardly toward its original position with the free end 39 thereof in engagement with the base wall of the divider member stepped bore 31 displacing the proportioning piston valve member 45 from the sealing member seat 49 and thereby opening the proportioning piston groove 42 to again establish pressure fluid communication between the inlet and outlet ports 11, 12 through the flow passage F and effect complete elimination of the output fluid pressure $P_o$.

In the event of the failure of the input fluid pressure $P_1$ due to a malfunction of the split system master cylinder or other leaks or the like, it is, of course, desirable to obviate the metering function of the proportioning piston 35 and effect the application of the input fluid pressure $P_2$ through the bypass passage B to establish an unaltered or unmetered output fluid pressure $P_o$ at the outlet port 12 in order to utilize the maximum available fluid pressure for energizing the vehicle brake set connected with said outlet port under such emergency conditions; therefore, when the magnitude of the input fluid pressure $P_2$ exceeds that of the failed input fluid pressure $P_1$ by a predetermined value, the force $P_2 A_5$ acting on the switch piston 60 will displace said switch piston rightwardly toward its rightward displaced or translated position engaging the switch piston end portion 63 with the end wall of the housing bore 3 since the force $P_1 A_4$ normally opposing such translatory movement is eliminated upon the failure of the input fluid pressure $P_1$. This rightward translatory movement of the switch piston 60 also moves the leftward end portion 62 thereof toward a displaced or translated position in the divider member bore 27 disengaging the seal 66 therefrom to open the bypass passage B between the inlet and outlet ports 11, 12. In this manner, the input fluid pressure $P_2$ flows from the inlet port 11 through the housing annular chamber 21, the divider member passage 28 and bore 27 into the housing counterbores 4, 5 and therefrom to the outlet port 12 in bypass relation with the proportioning piston 35 to obviate metering actuation thereof, and it is, of course, obvious that the bypass output fluid pressure $P_o$ so established at the outlet port 12 is equal to the input fluid pressure $P_1$ at the inlet port 11 when the bypass passage B is open to effect the application of the maximum available fluid pressure to the vehicle brake set connected with said outlet port under the emergency conditions. Further, the rightward translatory movement of the switch piston 60 also moves the cam surface 71 thereof rightwardly toward a position driving the switch member 75 upwardly against the compressive force of the switch spring 79 to engage the contact 78 with the interior end of the terminal 74 and, in this manner, complete the electrical circuit for energizing the driver warning or dash lamp (not shown).

The control valve 1 functions in substantially the same manner to complete the electrical circuit for energizing the driver warning or dash lamp in the event of the alternative failure of the supplied fluid pressure $P_2$. Failure of the fluid pressure $P_2$, of course, eliminates the forces $P_2A_5$, $P_oA_3$ acting on the switch piston 60 and the centering piston 55 wherein the force of the supplied fluid pressure $P_1$ acting on the switch piston area $A_4$ effects the leftward translatory movement of the switch piston 60 to engage the end 66 of the switch piston leftward end portion 62 with the end wall 29 of the divider bore 27 which defines the leftward translated position of said switch piston, said centering piston being concertedly movable with said switch piston. During the leftward translatory movement of the switch piston 60, the cam surface 72 thereof drivingly engages the switch member 75 to actuate the switch 18, as previously described.

From the foregoing, it is now apparent that a novel control valve 1 meeting the objects set out hereinbefore, as well as other objects and advantageous features, is provided and that changes and modifications as to the precise configurations, shapes and details of the constructions set forth in the disclosure by way of illustration may be made by those skilled in the art without departing from the spirit of the invention.

The embodiments of the invention in which I claim an exclusive property or privilege are defined as follows:

1. A control valve comprising a housing, means removably secured within said housing and defining therewith a pair of pressure fluid flow passages connected in bypass relation through said housing for one of separate fluid pressures supplied thereto, metering means movable in said first named means for controlling one of said flow passages, said metering means being movable in response to the one supplied fluid pressure toward a metering position in said one flow passage to establish metered applied fluid pressure in a predetermined ratio with the one supplied fluid pressure, and other means for comparing the magnitudes of the supplied fluid pressures and movable in said first-named means for controlling the other of said flow passages, said other means being movable in response to the one supplied fluid pressure in said other flow passage acting thereon toward a translated position to establish open pressure fluid communication between the one supplied fluid pressure and the applied fluid pressure through said other flow passage in bypass relation with said one flow passage and obviate the metering actuation of said metering means in the event of the failure of the other of the supplied fluid pressures acting on said other means.

2. A control valve according to claim 1, wherein said first-named means includes a divider member in said housing between said metering means and said other means, a bore in said divider member defining a portion of said one flow passage, said metering means being movable in said bore in response to the one supplied fluid pressure to establish the metered applied fluid pressure.

3. A control valve according to claim 1, wherein said first-named means includes a divider member between said metering means and said other means, a bore in said divider member defining a portion of said other flow passage, and said other means being movable in said bore, said other means being movable from a normal position closing said bore to interrupt pressure fluid communication therethrough between the one supplied fluid pressure and the applied fluid pressure toward its translated position opening said bore.

4. A control valve according to claim 3, comprising seal means normally engaged between said other means and said bore to close said other flow passage, said seal means being disengaged from one of said other means and said bore upon the movement of said other means toward its translated position to open said other flow passage.

5. A control valve according to claim 3, comprising seal means on said other means and normally engaged with said bore to close said other flow passage, said seal means being displaced from engagement with said bore to open said other flow passage upon the movement of said other means to its translated position.

6. A control valve according to claim 1, wherein said first-named means includes a divider member between said metering means and said other means, a pair of opposed bores in said divider member respectively defining portions of said flow passages, said metering means being movable in one of said bores in response to the one supplied fluid pressure to establish the applied fluid pressure, and said other means being movable in the other of said bores from a normal position closing said other bore to interrupt pressure fluid communication therethrough between the one supplied fluid pressure and the applied fluid pressure toward its pressure fluid communication establishing position opening said bore.

7. A control valve according to claim 1, comprising a pair of opposed effective areas on said metering means for respective subjection to the one supplied and applied fluid pressures, said metering means being initially movable in response to the one supplied fluid pressure and the applied fluid pressure of a predetermined value respectively acting on said areas toward a position in said one flow passage isolating the one supplied fluid pressure from the applied fluid pressure and being thereafter further movable in response to increases in the one supplied fluid pressure in excess of the predetermined value acting on one of said opposed areas toward its metering position to effect a metered increase in the applied fluid pressure acting on the other of said opposed areas in a predetermined ratio with the increased one supplied fluid pressure in excess of the predetermined value.

8. A control valve according to claim 1, comprising a pair of opposed areas on said other means respectively subjected to the supplied fluid pressures, said other means being movable toward its translated position when the magnitude of the one supplied fluid pressure acting on one of said opposed areas exceeds that of the other supplied fluid pressure acting on the other of said opposed areas by a predetermined amount.

9. A control valve according to claim 8, wherein said other opposed area is predeterminately greater than said one opposed area, centering means movable in said housing for engagement with said housing and said other means, and a third area on said centering means additive to said one opposed area and subjected to the applied fluid pressure, the force of the applied fluid pressure acting on said third area urging said centering means toward engagement with said housing and said other means and being additive to the force of the one supplied fluid pressure acting on said other means in response to the opposing force of the other supplied fluid pressure acting on said other area.

10. A control valve according to claim 1, comprising centering means movable in said housing for engagement with said housing and with said other means and subjected to the applied fluid pressure, said centering means being urged in response to the applied fluid pressure acting thereon toward engagement with said housing and said other means to oppose movement of said other means in response to the other supplied fluid pressure acting thereon.

11. A control valve comprising a housing, means removably secured within said housing and defining therewith a pair of pressure fluid flow passages connected in bypass relation through said housing for one of separate fluid pressures supplied thereto, metering means movable in said first-named means for controlling the application through one of said flow passages of the one supplied fluid pressure, said metering means being initially movable in response to the one supplied fluid pressure and the applied fluid pressure of a predetermined value toward a position in said one flow passage isolating the one supplied fluid pressure from the applied fluid pressure an being thereafter further movable in response to increases in the one supplied fluid pressure toward a metering position is said one flow passage effecting a metered increase in the applied fluid pressure in a predetermined ratio with the increased one supplied fluid pressure in excess of the predetermined value, other means movable in said first-named means and said housing for controlling the bypass flow of the one supplied fluid pressure through the other of said flow passages and for comparing the magnitudes of the supplied fluid pressures, said other means being movable from a normal position in said other flow passage isolating the one supplied fluid pressure from the applied fluid pressure in the event that the magnitude of the other of the supplied fluid pressures acting on said other means is reduced to a value predeterminately less than that of the one supplied fluid pressure acting on said other means in opposition to the other supplied fluid pressure toward a translated position effecting open pressure fluid communication between the one supplied fluid pressure and the applied fluid pressure through said other flow passage in bypass relation with said one flow passage and said metering means to obviate the metering actuation thereof, and said first-named, metering means, and other means being substantially coaxial within said housing.

12. A control valve comprising a housing having a pair of inlet ports and an outlet port therein, a divider member removably secured within said housing between one of said inlet ports and said outlet port, a pair of passage means in said divider means respectively connected in bypass relation between said one inlet port and said outlet port, metering means movable in said divider member for controlling pressure fluid communication through one of said passage means between said one inlet port and said outlet port, said metering means being initially movable in response to fluid pressures at said one inlet port and said outlet port of a predetermined value toward an isolating position in said one passage means interrupting pressure fluid communication between said one inlet port and said outlet port and being thereafter further movable in response to increases in the fluid pressure at said one inlet port toward a metering position in said one passage means establishing metered pressure fluid communication between the fluid pressures at said one inlet port and outlet port to effect a metered increase in the fluid pressure at said outlet port in a predetermined ratio with the increased fluid pressure at said one inlet port in excess of the predetermined value, and other means movable in said divider means and housing for controlling pressure fluid communication through the other of said passage means between said one inlet port and said outlet port and for comparing the magnitudes of the fluid pressures at said inlet ports, said other means being movable from a normal position interrupting pressure fluid communication through said other passage means between said one inlet port and said outlet port toward a translated position establishing open pressure fluid communication between said one inlet port and said outlet port through said other passage means in bypass relation with said one passage means to obviate the metering actuation of said metering means when the magnitude of the fluid pressure at the other of said inlet ports acting on said other means is reduced to a value predeterminately less than that of the fluid pressure at said one inlet port acting on said other means in opposition to the fluid pressure at said other inlet port.

13. A control valve according to claim 12, comprising abutment means on said divider member in said one passage means, means in said divider member defining a valve seat about said one passage means, said metering means including piston means movable in said divider member, valve means on said piston means for engagement with said valve seat, and resilient means urging said piston means toward a normal position in abutting engagement with said abutment means and displacing said valve means from said valve seat, said piston means being initially movable from its normal position to its isolating position against the force of said resilient means to engage said valve means with said valve seat and the force of said resilient means thereafter assisting movement of said piston means from its isolating position to its metering position to disengage said valve means from said valve seat.

14. A control valve according to claim 12, comprising a pair of stepped bores in said divider member defining a portion of said one passage means and respectively connected with said one inlet port and said outlet port, a shoulder on said divider member between said stepped bores, said valve seat, sealing means engaged with said shoulder and normally in sealing engagement with one of said stepped bores, a valve seat on said sealing means about said one passage means, said metering means including a piston slidable in said one stepped bore, extension means on said piston means extending through said valve seat into the other of said stepped bores, valve means on said extension means for engagement with said valve seat, and resilient means normally urging said piston means toward a position in said divider member displacing said valve means from said valve seat, said piston means being initially movable toward its isolating position against the force of said resilient means to engage said valve means with said valve seat and the force of said resilient means thereafter assisting movement of said piston means from its isolating position to its metering position to disengage said valve means from said valve seat.

15. A control valve according to claim 14, comprising a third bore in said divider member connected between said one inlet port and said outlet port, said other means including other piston means having opposed portions slidable in said third bore and said housing and subjected to the fluid pressures at said one and other inlet ports, respectively, and seal means engaged between said third bore and one of said opposed portions to interrupt pressure fluid communication through said third bore between said one inlet port and said outlet port when said other means is in its normal position, said seal means being disengaged from sealing engagement with one of said third bore and said one opposed portion upon the movement of said other means toward its translated position to establish open pressure fluid communication through said third bore between said one inlet port and said outlet port.

16. A control valve according to claim 12, comprising a bore in said divider member defining a portion of said other flow passage and having opposed ends respectively connected with said one inlet port and said outlet port, said other means including piston means having opposed portions slidable in said housing and said bore and subjected to the fluid pressures at said one and other inlet ports, respectively, and seal means engaged between said bore and one of said opposed portions to interrupt pressure fluid communication through said bore between said one inlet port and said outlet port when said piston means is in its normal position, said seal means being disengaged from one of said bore and said one opposed portion upon the movement of said piston means toward its translated position to establish open pressure fluid communication through said bore between said one inlet port and said outlet port.

17. A control valve according to claim 16, wherein said seal means is on said one opposed portion and slidable in one of the opposed ends of said bore in sealing engagement therewith when said piston means is in its normal position, said seal means being displaced from said one opposed end of said bore upon the movement of said piston means to its translated position.

18. A control valve comprising a housing, first, second and third bores in said housing substantially in axial alignment, a first shoulder on said housing between said first and second bores, a closure member connected with said housing and closing the end of said first bore opposite to said first shoulder, first and second inlet ports in said housing and connected with said first and third bores, respectively, an outlet port in said housing and connected with said second bore, a sleeve member substantially coaxial with said first bore and having first and second opposed ends in abutting engagement with said first shoulder and said closure member, respectively, a first seal engaged between said sleeve member and said first bore adjacent to said first shoulder, first extension means on said first opposed end extending into said second bore and having a first free end portion thereon, a fourth bore in said sleeve member extending through said extension means and having third and fourth opposed ends, said third opposed end intersecting with said free end portion and being connected in pressure fluid communication with said outlet port, a first passage in said sleeve portion having one end connected with the fourth opposed end of said fourth bore and the other end thereof connected in open pressure fluid communication with said first inlet port, fifth and sixth stepped bores in said sleeve member, said fifth bore intersecting with said second opposed end of said sleeve member, a second shoulder on said sleeve member between said fifth and sixth bores, a second passage in said sleeve member having one end connecting with said fifth bore and the other end thereof connected in open pressure fluid communication with said one inlet port, a third passage in said sleeve member having one end connected with said sixth bore and the other end thereof connected in open pressure fluid communication with said outlet port, a second seal in said sleeve member engaged with said fifth bore and said second shoulder, an opening in said second seal between said fifth and sixth bores, a valve seat on said second seal about said opening, a first piston slidable in said fifth bore including second extension means extending through said second seal opening into said sixth bore, valve means on said second extension means for engagement with said valve seat, first abutment means on said sleeve member in said sixth bore, a second free end portion on said second extension means for engagement with said first abutment means, a metering spring in said fifth bore engaged between said first piston and said closure member normally urging said first piston toward a normal position engaging said second free end portion with said first abutment means and displacing said valve means from said valve seat, first and second opposed effective areas on said first piston for respective subjection to the fluid pressure at said one inlet port and said outlet port, said first piston being movable from its normal position against the force of said metering spring in response to fluid pressures at said one inlet port and said outlet port of a predetermined value respectively acting on said first and second areas toward an isolating position engaging said valve means with said valve seat to interrupt pressure fluid communication between said one inlet port and said outlet port through said fifth and sixth bores and said piston means being thereafter further movable and assisted by the force of said metering spring in response to increases in the fluid pressure at said one inlet port in excess of the predetermined value acting on said first area toward a metering position disengaging said valve means from said valve seat to effect a metered increase of the fluid pressure at said outlet port acting on said second area in a predetermined ratio with the increased fluid pressure at said one inlet port in excess of the predetermined value, a second piston movable in said housing between a centered position and opposed translated positions including fifth and sixth opposed ends slidable in said third and fourth bores, respectively, third and fourth opposed effective areas on said fifth and sixth opposed ends for subjection to the fluid pressures at said second and first inlet ports, respectively, and a third seal engaged between said fourth bore and said sixth opposed end to normally interrupt pressure fluid communication through said fourth bore between said first inlet port and said outlet port when said second piston is in its centered position, said third seal being disengaged form one of said fourth bore and said sixth opposed end upon the movement of said second piston from its centered position to one of its opposed translated positions in response to the fluid pressure at said first inlet port acting on said fourth area upon the failure of the fluid pressure at said second inlet port acting on said third area to establish open pressure fluid communication between said first inlet port and said outlet port through said fourth bore in bypass relation with said fifth and sixth bores and obviate the metering actuation of said first piston.

19. A control valve comprising a housing, means removably secured within said housing and defining therewith another inlet chamber, an outlet chamber in said housing between said first-named and other means and connected in pressure fluid communication with said first named inlet chamber, metering means movable in said first-named means and being generally operable to effect the application of metered fluid pressure from said first-named inlet chamber to said outlet chamber to establish a metered applied fluid pressure therein upon preselected conditions, passage means in said first named means between said first-named inlet chamber and said outlet chamber in bypass relation with said metering means, and said other means including means for controlling said passage means, said included means being movable with said other means in response to fluid pressure in said passage means acting on said included means toward a translated position establishing pressure fluid communication through said passage means between said first named inlet chamber and said outlet chamber bypassing said metering means upon the failure of fluid pressure in said other inlet chamber acting on said other means in opposition to the fluid pressure in said passage means acting on said included means.

20. A control valve according to claim 19, comprising means on said first-named means defining a valve seat about said passage means, valve means on said included means and normally engaged with said valve seat closing said passage means, said valve means being disengaged from said valve seat to open said passage means upon the movement of said other means to its translated position.

21. A control valve according to claim 19, wherein said included means is movable in said passage means, sealing means on said included means and normally in sealing engagement with said first named means within said passage means to interrupt pressure fluid communication therethrough between said first named inlet chamber and said outlet chamber, said sealing means being disengaged from said first-named means to open said passage means and establish pressure fluid communication therethrough between said first named inlet chamber and said outlet chamber upon the movement of said other means to its translated position.

22. A control valve comprising a housing, means removably secured within said housing and defining a flow passage therethrough for one of separate fluid pressures supplied to said housing, metering means movable in said first-named means controlling said flow passage and generally operable to effect the application therethrough of a metered applied fluid pressure in response to the one supplied fluid pressure acting thereon upon preselected conditions, means in said first-named means defining another flow passage through said housing in bypass relation with said first-named flow passage for the one supplied fluid pressure, other means movable in said housing for comparing the magnitudes of the supplied fluid pressures including means for controlling said other flow passage, said included means being movable with said other means in response to the one supplied fluid pressure in said other flow passage acting on said included means toward a translated position establishing flow of the one supplied fluid pressure through said other flow passage bypassing said metering means in the event of the failure of the other of the supplied fluid pressures acting on said other means.

23. A control valve according to claim 22, wherein a portion of said other flow passage defines a valve seat in said first-named means about said other flow passage, valve means on said included means and normally engaged with said valve seat closing said other flow passage to interrupt the flow of the one supplied fluid pressure therethrough, said valve means being disengaged from said valve seat to open said other flow passage and establish the flow of the one supplied fluid pressure therethrough upon the movement of said other means to its translated position.

24. A control valve according to claim 22, wherein said included means is movable in said other flow passage, sealing means engaged between said included means and said other flow passage to interrupt the flow of said one supplied fluid pressure therethrough, said sealing means being disengaged from one of said included means and other flow passage to establish the flow of the one supplied fluid pressure through said other flow passage upon the movement of said other means to its translated position.

UNITED STATES PATENT OFFICE
CERTIFICATE OF CORRECTION

Patent No. 3,597,014            Issued August 3, 1971

Stanley L. Stokes

It is certified that error appears in the above-identified patent and that said Letters Patent are hereby corrected as shown below:

Column 1, line 69, "others", second occurrence, should read -- other --. Column 2, line 1, "in", second occurrence, should read -- to --; line 41, "end" should read -- and --. Column 3, line 34, after "having" insert -- a --; line 58, after "should" insert -- also --; line 72, after "57" insert a comma -- , --. Column 4, line 57, "l and" should read -- land --.

Column 5, line 13, "iston" should read -- piston --; line 14, "pessure" should read -- pressure --; line 23, "apied" should read -- applied --; line 47, "$(A_1 - A)$" should read -- $(A_1 - A_2)$ --. Column 6, lines 3 and 4, "$P \; P_2 (A_1 - A)$" should read -- $P_2 (A_1 - A_2)$ --; line 15, "$Po = (P_2 (A_1 - A) + Fc/A_1$" should read -- $Po = \dfrac{P_2 (A_1 - A_2) + Fc}{A_1}$ --; line 28, after "increases" insert -- in --; line 44, "said", second occurrence, should read -- the --. Column 7, line 48, "constructions" should read -- construction --. Column 9, line 20, "an" should read -- and --; line 22, "is" should read -- in --; line 62, after "and" insert -- said --. Column 12, line 9, "form" should read -- from --; line 20, after "therewith" insert -- an inlet chamber, other means movable in said housing and defining therewith -- .

Signed and sealed this 10th day of April 1973.

(SEAL)
Attest:

EDWARD M. FLETCHER, JR.
Attesting Officer

ROBERT GOTTSCHALK
Commissioner of Patents